US008691884B2

(12) United States Patent
Ellsworth et al.

(10) Patent No.: US 8,691,884 B2
(45) Date of Patent: *Apr. 8, 2014

(54) CROSSLINKED FLAME RETARDANT THERMOPLASTIC ELASTOMER GELS

(75) Inventors: Mark W. Ellsworth, Dublin, CA (US); Michael A. Oar, San Francisco, CA (US); Miguel A. Morales, Fremont, CA (US)

(73) Assignee: Tyco Electronics Corporation, Berwyn, PA (US)

( * ) Notice: Subject to any disclaimer, the term of this patent is extended or adjusted under 35 U.S.C. 154(b) by 201 days.

This patent is subject to a terminal disclaimer.

(21) Appl. No.: 12/954,560

(22) Filed: Nov. 24, 2010

(65) Prior Publication Data
US 2012/0129962 A1 May 24, 2012

(51) Int. Cl.
C08J 9/04 (2006.01)
C08J 3/24 (2006.01)

(52) U.S. Cl.
CPC ... *C08J 3/24* (2013.01); *C08J 3/246* (2013.01)
USPC .................. 521/85; 521/88; 521/90; 521/134; 521/146; 521/148; 525/88; 525/89; 525/98; 524/101; 524/127; 524/140

(58) Field of Classification Search
USPC .............. 525/88, 89, 98; 521/85, 88, 90, 134, 521/146, 148; 524/101, 127, 140
See application file for complete search history.

(56) References Cited

U.S. PATENT DOCUMENTS

| 5,149,334 | A | 9/1992 | Lahrman et al. |
| 5,412,022 | A | 5/1995 | Andres et al. |
| 5,849,824 | A | 12/1998 | Mercer et al. |
| 6,207,752 | B1 | 3/2001 | Abraham et al. |
| 6,653,408 | B1 | 11/2003 | St. Clair |
| 6,756,440 | B2 | 6/2004 | Hase et al. |
| 7,169,849 | B2 | 1/2007 | Ikuji et al. |
| 7,608,668 | B2 | 10/2009 | Shan et al. |
| 2002/0065356 | A1 | 5/2002 | Crevecoeur et al. |
| 2005/0288436 | A1 | 12/2005 | Ring et al. |
| 2006/0084740 | A1 | 4/2006 | Kao et al. |
| 2006/0278425 | A1 | 12/2006 | Harada et al. |
| 2007/0270553 | A1 | 11/2007 | Bohm et al. |
| 2008/0114102 | A1 | 5/2008 | Balfour et al. |
| 2009/0124743 | A1 | 5/2009 | Lee |
| 2010/0087079 | A1 | 4/2010 | Pyun et al. |
| 2011/0015350 | A1 | 1/2011 | Ellsworth et al. |

FOREIGN PATENT DOCUMENTS

| CN | 101469100 | * | 7/2009 |
| CN | 101649081 | A | 2/2010 |
| DE | 19920799 | A1 | 11/2000 |
| EP | 0879832 | A1 | 11/1998 |
| EP | 1548078 | A1 | 12/2004 |
| EP | 1582203 | A1 | 10/2005 |
| EP | 1770119 | A1 | 4/2007 |
| JP | 55-129442 | A | 10/1980 |
| JP | 2000-34454 | A | 2/2000 |
| JP | 2007-51195 | A | 3/2007 |
| JP | 2007-277390 | A | 10/2007 |
| WO | WO-98/40436 | A1 | 9/1998 |
| WO | WO-00/26285 | A1 | 5/2000 |
| WO | WO-01/92344 | A2 | 12/2001 |
| WO | WO-03/068878 | A2 | 8/2003 |
| WO | WO-2008/004376 | A1 | 1/2008 |

OTHER PUBLICATIONS

Abstract CN 101469100, Jul. 2009.*
"An Introduction to Kraton Polymers: Structure, Chemistry, Performance", Kraton Polymers, 2008.
"Dow Product Selection Guide for Engage Polyolefin Elastomers", The Dow Chemical Company, Jun. 2009.
Ansems et al., "Oil Extension of Olefin Block Copolymers", *ANTEC Conference Proceedings*, vol. 2, p. 959-963, 2007.
Batra et al., "Highly Oil-Extended Olefin Block Copolymers", *ANTEC Conference Proceedings*, p. 855-859, 2009.
Chang et al., "Morphology and Flame-Retardancy Properties of Ternary High-Impact Polystyrene/Elastomer/Polystyrene-Encapsulated Magnesium Hydroxide Composites", *Journal of Applied Polymer Science*, vol. 108, p. 2488-2493, 2008.
David J. St. Clair, "Temp Service", *Adhesives Age*, Sep. 2001, p. 31-40.
Francois Chambon and H. Henning Winter, "Stopping of Crosslinking Reaction in a PDMS Polymer at the Gel Point", *Polymer Bulletin*, 13, p. 499-503, 1985.
International Search Report for International Application No. PCT/US2011/062080, dated Feb. 21, 2012.
International Search Report for International Application No. PCT/US2011/062088, dated Jun. 13, 2012.
International Search Report for International Application No. PCT/US2011/062083, dated Feb. 16, 2012.
Ishikawa et al., "Thermal Behaviors and Flame-Retardancy of Styrene-Ethylene-butadiene-Styrene-block Copolymer Containing Various Additives", *Journal of Applied Polymer Science*, vol. 104, p. 156-161, 2007.
Kibble et al., "Mechanical Properties and Flame Retardancy of SEBS-Based Composites Filled with Aluminium Hydroxide", *Polymers and Polymer Composites*, vol. 16, No. 7, p. 423-430, 2008.
Taubert et al., "Novel Polyimide Ionomers: $CO_2$ Plasticization, Morphology, and Ion Distribution", Polymer, 44, p. 1881-1892, 2003.
Wang et al., "The Gelation Behaviors of the Reactive Blends of Nylon1212 and Functional Elastomer", *Journal of Materials Science*, vol. 43, p. 5755-5762, 2008.
Wang-Dong Xiao, Kevin A. Kibble, Feng Lin, "Mechanical Properties and Flame Retardancy of SEBS-based Composites with Magnesium Hydroxide", *Polymers and Polymer Composites*, vol. 17, No. 2, 2009, p. 117-125.
Zhou et al., "A Study on Flame-retardant Technology of SEBS", *Fine Chemical Intermediates*, Abstract vol. 36, No. 3, p. 52-54, Jun. 2006.

* cited by examiner

*Primary Examiner* — Irina S Zemel

(57) ABSTRACT

Crosslinked flame retardant thermoplastic elastomer gels are provided. The crosslinked flame retardant thermoplastic elastomer gels comprise a char catalyst, a char former, a maleic anhydride-modified styrene ethylene/butylene styrene polymer, and a softener oil. Methods are provided of making crosslinked flame retardant thermoplastic elastomer gels.

19 Claims, 2 Drawing Sheets

CROSSLINKED FLAME RETARDANT THERMOPLASTIC ELASTOMER GELS

BACKGROUND

This application relates to polymeric gels, in particular crosslinked flame retardant thermoplastic elastomer gels.

In today's modern electrical and electronic devices, as well as in other uses such as fiber optic connections, sealants are often used for insulation, for protection against water, corrosion and environmental degradation, optical index matching, and thermal management. Prior to now, a number of sealants and gels have been known, however, none of these previous sealants and gels have the same components and offer the same combination of properties as the compositions described and claimed herein.

It is known that sealants have been designed specifically to self-extinguish upon exposure to flame. These flame retardant sealants may self-extinguish using the mechanism known as intumescence. When an intumescent flame retardant material is introduced to flame, some or all of the material will quickly form a char barrier. The char barrier is typically foamed away from itself. By foaming away, the char barrier blocks oxygen and the ambient flame from reaching the fuel source. As a result, the intumescent flame retardant material may self-extinguish.

Sealants have been made that incorporate halogen-based additives. Halogen-based additives can provide relative protection from fire hazards. Some halogen containing compositions suffer from inadequacies and can generate, upon combustion, corrosive hydrogen halides. Moreover, some halogenated flame retardants may be considered hazardous and are not Reduction of Hazardous Substances ("RoHS") compliant.

Sealants have been made that incorporate metal hydroxides as flame retardants. However, compositions generally require large amounts of the metal hydroxides to be effective for imparting flame retardancy. Metal hydroxides are generally not suitable for developing soft flame retardant thermoplastic elastomer compositions as they can increase specific gravity and can undesirably increase the hardness of compositions.

As technology progresses, sealants will be subjected to increasingly higher temperature environments and more demanding performance requirements. There has been, and there presently exists, a need for high performance sealants to meet these demands.

Gels, for example, have been used as sealants with relative success in certain applications due to their unique properties. Gels may have a lower hardness than rubber and can seal and conform under adequate compression. Gels may also be more elastic than mastics. Other advantages of gels are known in the art. For example, gels, when used as sealants, may be removed and re-entered more easily due to elastic recovery of the gel. For further example, relatively little force is required to change the shape of a soft gel sealant.

Solid particulates have been added to alter a gel's properties. However, one of the problems with flame retarding a soft gel is that the addition of solid particulate fillers leads to hardening and produces a gel with poor sealing properties. Other disadvantages of gels are known in the art.

One class of gels used as a sealant is thermoplastic elastomer gels (TPEGs). Certain TPEGs have advantages over other classes of gels such as silicone gels, polyurethane gels, and polybutadiene gels. For example, silicone gels may have a higher cost compared to TPEGs, a silicone gel's dielectric breakdown voltage may be adversely affected by humidity, and low surface energy silicone oils can leak or evaporate out of the gel and spread over electrical contact points leading to problematic insulation barriers.

Problems with polyurethane and polybutadiene gels include, for example, hydrolytic instability of the crosslinked network; and degradation and hardening with aging. In addition, environmental concerns regarding certain non-TPEGs have led to an increased interest in developing gels with enhanced safety profiles while achieving sufficient or enhanced properties.

TPEGs have provided many years of reliable in-field performance for applications requiring a low maximum service temperature of approximately 70° C. TPEGs have been made that comprise a styrene ethylene/butylene styrene ("SEBS") triblock copolymer swollen with a mineral oil softener. While the thermoplastic nature of these gels allows for easy production, it limits the upper service temperature due to creep and flow as in-field ambient temperatures approach the styrene glass transition. Research has been aimed at increasing the upper service temperature of these gels through chemically crosslinking the gel network in order to form a thermoset gel structure. For example, oil-swelled acid/anhydride modified maleic anhydride SEBS gels have been covalently crosslinked using small molecule crosslinkers like di- and triamines, see European Publication No. EP 0879832A1 (Wang et al.), published Nov. 25, 1998, as well as with some metal salts, D. J. St. Clair, "Temp Service," Adhesives Age, pp. 31-40, September 2001. Crosslinked polymers are known to increase thermal stability, toughness, and chemical resistance compared to their base, or uncrosslinked polymers. However, crosslinked polymers are also known to often be intractable, making them difficult to reprocess or recycle.

In addition, safety is a growing concern for sealants and gels. Governments and producers of sealants and gels have taken and will continue to take steps to reduce the use of materials that may be hazardous to people's health. In particular, efforts have been taken to reduce and eliminate halogenated flame retardants (e.g., polybrominated biphemyls (PBB), poly brominated diphenyl ether (PBDE)) in sealants and gels. Other problems and attempts to address them are known in the art.

U.S. Pat. No. 6,207,752 to Abraham et al. relates to low oil swell carboxylated nitrile rubber-thermoplastic polyurethane vulcanizate compositions. The nitrile rubbers of Abraham contain pendant carboxyl groups that can be crosslinked. The patentees report unexpectedly discovering that a processing aid can improve the processability of the compositions. The patent lists a number of processing aids including maleated polyethylene, maleated styrene-ethylene-butene-styrene-block copolymers and maleated styrene-butadiene-styrene-block copolymers, and maleated ethylene-propylene rubber.

U.S. Pat. No. 6,756,440 to Hase et al. relates to a fire resistant resin composition, a method of making the resin composition and an electrical wire comprising the composition. The composition has a halogen-free propylene resin containing propylene as a monomer component, a halogen-free styrene-based thermoplastic elastomeric resin modified with an unsaturated carboxylic acid or a derivative of such an acid, and a fire resistant metal hydroxide.

U.S. Published Patent Application No. 2002/0065356 to Crevecoeur et al. relates to flame retardant polymers with a condensation polymer, a halogen-containing styrene polymer, a polymer derived from aromatic vinyl monomer, and elastomeric polymer segments. The polymers derived from aromatic vinyl monomers may be crosslinked.

International Publication No. WO 98/40436 to Perkins et al. relates to flame retardant gels of oil-extended triblock copolymers. The gel compositions may contain ammonium polyphosphate and synergists such as organic amine phosphates and melamine phosphate. The compositions may contain polyols such as polyerythritol.

BRIEF SUMMARY

In one aspect, a crosslinked flame retardant thermoplastic elastomer gel is provided. The crosslinked flame retardant thermoplastic elastomer gel comprises (1) a first set of components; the first set of components further comprising a char catalyst and a char former; and (2) a second set of components, the second set of components further comprising a maleic anhydride-modified SEBS and a softener oil.

In another aspect, a method is provided for making a crosslinked flame retardant thermoplastic elastomer gel comprising (1) providing a first set of components, where the first set of components comprises a char catalyst and a char former; (2) providing a second set of components, where the second set of components comprises a maleic anhydride-modified SEBS and a softener oil; (3) combining the first set of components with the second set of components under conditions sufficient to form a crosslinked polymer gel.

DETAILED DESCRIPTION

Figure 1:
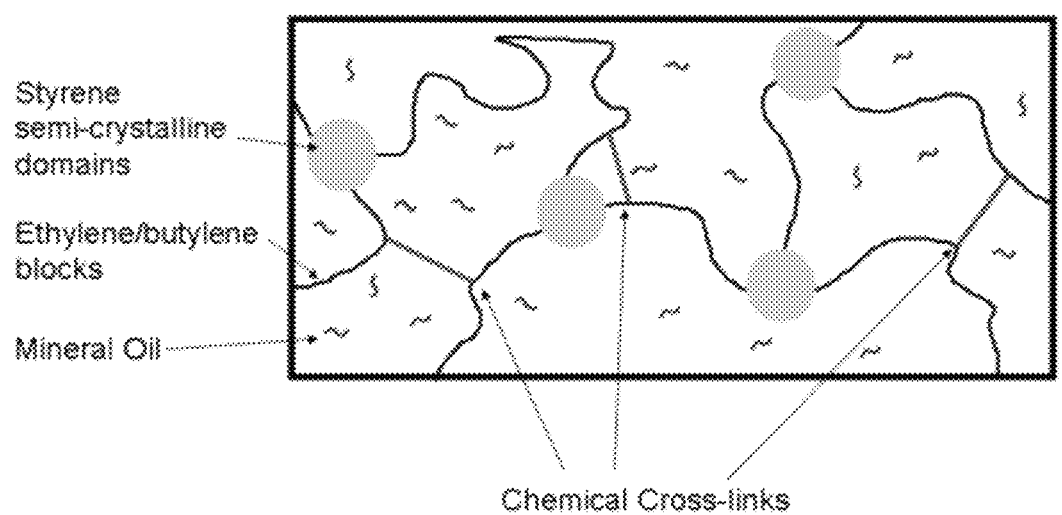
FIG. 1 is a diagram representing the structural enhancement of SEBS triblock gels upon chemically crosslinking the ethylene/butylenes blocks.

As used herein, terms such as "typically" are not intended to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

As used herein the terms "comprise(s)," "include(s)," "having," "has," "contain(s)," and variants thereof, are intended to be open-ended transitional phrases, terms, or words that do not preclude the possibility of additional acts or structure.

As used herein, "polymer" means a polymeric compound prepared by polymerizing monomers, whether of the same or a different type. The generic term "polymer" embraces the terms "homopolymer," "copolymer," "terpolymer" as well as "interpolymer."

As used herein, "interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

Any concentration range, percentage range, or ratio range recited herein are to be understood to include concentrations, percentages or ratios of any integer within that range and fractions thereof, such as one tenth and one hundredth of an integer, unless otherwise indicated. Also, any number range recited herein relating to any physical feature are to be understood to include any integer within the recited range, unless otherwise indicated. It should be understood that the terms "a" and "an" as used above and elsewhere herein refer to "one or more" of the enumerated components. For example, "a" polymer refers to one polymer or a mixture comprising two or more polymers.

Gel Compositions

In general, the gels described herein can be considered to include at least two sets of components. The first set of components includes a char catalyst, a char former, and optionally, a blowing agent. The second set of components includes a maleic anhydride modified SEBS and a softener oil. In some embodiments, the first set of components is between 30 wt % and 50 wt % of the gel, and the second set of component is between 50 wt % and 70 wt % of the gel. In other embodiments, the first set of components is between 35 wt % and 40 wt % of the gel, and the second set of component is between 60 wt % and 65 wt % of the gel.

In some embodiments, the crosslinked flame retardant gels have flame retardancy sufficient to pass the UL-94 test. In other embodiments, the crosslinked flame retardant gels are RoHS compliant. Additional details, aspects and embodiments are provided herein.

Char Catalysts

The crosslinked flame retardant gel includes a char catalyst. In some embodiments, the char catalyst is present at 50 wt % to 80 wt % of the first set of components. In other embodiments, the char catalyst is present at 60 wt % to 70 wt % of the first set of components. In other embodiments, the char catalyst is present at about 67 wt % of the first set of components.

In one embodiment, the char catalyst is a linear polymer catalyst. In another embodiment, the char catalyst is a polymer catalyst that is at least partially branched. In one embodiment, the char catalyst has a chain length of less than about 1000 monomers. In another embodiment, the char catalyst has a chain length of less than about 100 monomers. In yet another embodiment, the char catalyst has a chain length of less than about 60 monomers.

In one embodiment, the char catalyst is an ammonium polyphosphate, having the following formula:

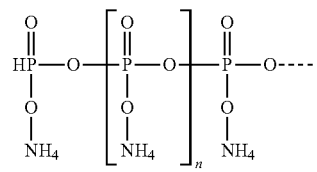

where n indicates chain length.

In another embodiment, the ammonium polyphosphates may be coated or uncoated. Coated ammonium polyphosphates have an added coating made of, for example, surface reacted silane. A coating may alter the characteristics of the ammonium polyphosphate. For example, a coating may reduce the solubility in water, result in a product that is less acidic or less abrasive. In one embodiment, the ammonium polyphosphate is uncoated. In another embodiment, the ammonium polyphosphate is a coated ammonium polyphosphate. In yet another embodiment, the coated ammonium polyphosphate includes formaldehyde. To form the coating, the formaldehyde may itself be reacted with other components such as melamine. Illustrative commercially available char catalysts are available from Budenheim (Zaragoza, Spain) such as FR CROS C30, C60, C70, from Ciba (Basle, Switzerland) such as MELAPUR MP and from Wellchem International Ltd. (Hangzhou, China) such as EXFLAM APP 201.

In another embodiment, the char catalyst is an acid salt. In yet another embodiment, the char catalyst is a salt of phosphoric acid. In yet another embodiment, the char catalyst is a salt of sulfuric acid. In another embodiment, the char catalyst is melamine monophosphate.

Char Formers

The crosslinked flame retardant gel includes a char former. Upon burning, certain materials char when they are burned. The presence of char may inhibit in full or in part the spread of flame by acting as a thermal barrier around the unburned material. The char former crosslinks the polymer gel when exposed to flame and the char catalyst.

In some embodiments, the char former is present at 10 wt % to 25 wt % of the first set of components. In other embodiments, the char former is present at about 20 wt % of the first set of components.

The char former may be configured to provide adequate pendant hydroxyls for performance. In one embodiment, the char former is a polyol such as pentaerythritol or dipentaerythritol. In one embodiment, the char former is selected from the group consisting of a polyol, a polysaccharide, an aminoplast such as tris(hydroxyethyl)isocyanurate (THEIC), and mixtures thereof. In another embodiment the char former is pentaerythritol.

Maleic Anhydride-Modified SEBS

Figure 2:
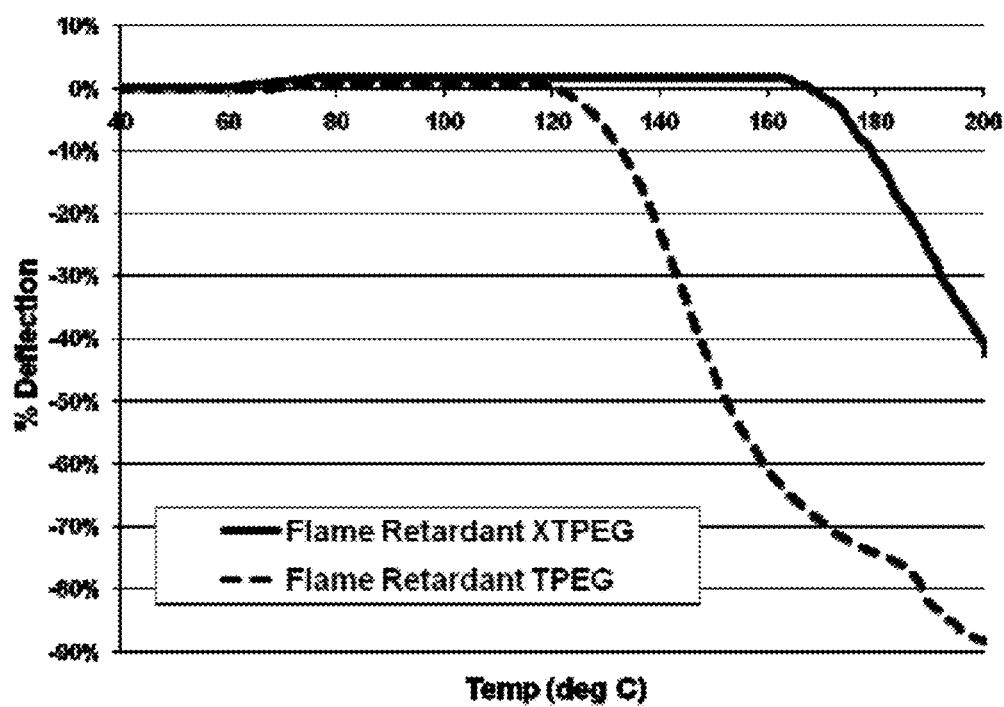
FIG. 2 is a graph showing the softening temperature from flame retardant crosslinked thermoplastic elastomer gel ("XTPEG") compared to flame retardant non-crosslinked thermoplastic elastomer gel ("TPEG").

The crosslinked flame retardant gel includes a maleic anhydride-modified SEBS. The maleated functional groups are configured for crosslinking during gel processing with di- and multi-amine crosslinkers, as well as aluminum, titanium and other organometallic compounds, and other crosslinkers such as polyol crosslinkers. Not wishing to be bound by theory, but it is believed that chemical crosslinking of the SEBS triblocks at the ethylene-butylene blocks further strengthens the gel structure (See FIG. 1), and as a result raises its softening temperature (See FIG. 2). Further not wishing to be bound by theory, it is believed the char former or a blowing agent may be responsible for at least a portion of the crosslinking. In some embodiments, the chemical crosslinking involves ionic crosslinking. In other embodiments, the chemical crosslinking involves covalent crosslinking.

Methods of preparing maleated block copolymers are known in the art and many such block copolymers are commercially available. For example, maleated block copolymers are disclosed in EP 0879832A1. Illustrative commercially available maleic anhydride-modified SEBS are available from Kraton Polymers (Houston, Tex.) as KRATON FG1901 (SEBS polymer having a polystyrene content of about 30 wt % and maleic anhydride grafted content of about 1.4-2.0 wt %) and KRATON FG 1924G (SEBS polymer with about 13 wt % polystyrene and maleic anhydride grafted content of about 0.7-1.3 wt %), and KRATON MD 6684CS (SEBS polymer having a polystyrene content of about 30 wt % and maleation level of about 1.0 wt %), and KRATON MD 6670. Illustrative commercially available maleic anhydride-modified SEBS are available from Asahi Chemical Industry Co., Ltd. (Tokyo, Japan) under the trade name M-1911 (maleation level of about 3.0 wt %), M-1913 (maleation level of about 2.0 wt %), and M-1943.

In one embodiment, the maleic anhydride-modified SEBS is present at 2.0 wt % to 20.0 wt % of the second set of components. In another embodiment, the maleic anhydride-modified SEBS is present at 2.0 wt % to 4.0 wt % of the second set of components.

In one embodiment, the maleic anhydride modified SEBS is KRATON MD6684CS. In another embodiment, the maleic anhydride-modified SEBS is KRATON FG6684. In yet another embodiment, the maleic anhydride modified SEBS is selected from the group consisting of as KRATON FG 1901, KRATON FG 1924G, KRATON MD 6684CS, and KRATON MD 6670. In another embodiment, the maleic anhydride-modified SEBS has a maleation level of between 1.0 wt % and 3.0 wt %.

Softener Oils

The crosslinked flame retardant gel includes a softener oil. In one embodiment, the softener oil is a mineral oil. In yet another embodiment, the softener oil is a paraffin oil. In other embodiments, the softener oil is a napthenic oil. In yet other embodiments, the softener oil is an aromatic oil. In a further embodiment, the softener oil is a mixture of different types of oils.

In one embodiment, the softener oil is a polyalpha olefin. Polyalpha olefins are hydrogenated synthetic hydrocarbon fluids used in a large number of automotive, electrical, and other industrial applications. DURASYN polyalpha olefins are authorized for use as components of non-food articles and are considered non-toxic. DURASYN 148 polyalphaolefin is a fully synthesized hydrogenated hydrocarbon base fluid produced from $C_{12}$ linear alphaolefin feed stocks and available from INEOS Oligomers, Houston, Tex.

Other suitable softener oils are known in the art, and others are disclosed in EP 0879832A1. In another embodiment, the softener oil is a linear alpha olefin. In yet another embodiment, the softener oil is a white mineral oil. An illustrative commercially available mineral oil is HYDROBRITE 380 PO (Sonneborn).

Optional Ingredients

Additional Crosslinker

In one embodiment, an additional crosslinker is added. In some embodiments, the additional crosslinker is a metal salt. In another embodiment, the additional crosslinker is aluminum acetylacetonate. In further embodiments, the additional crosslinker is selected from the group consisting of aluminum acetylacetonate, zinc acetylacetonate, titanium acetylacetonate and zirconium acetylacetonate, and mixtures thereof. In another embodiment, the additional crosslinker is an aluminum salt of acetic acid. For example, the additional crosslinker may be an aluminum triacetate $(Al(C_2H_3O_2)_3)$, aluminum diacetate, $(HO(Al(C_2H_3O_2)_3)$, or aluminum monoacetate, $((HO)_2(Al(C_2H_3O_2)_3)$. In another embodiment, the additional crosslinker is tetra(2-ethylhexyl)titanate.

In other embodiments, the additional crosslinker is an amine crosslinker. In further embodiments, the amine crosslinker is selected from the group consisting of an organic amine, an organic diamine, and an organic polyamine. In other embodiments, the amine crosslinker is selected from the group consisting of ethylene diamine; 1,2- and 1,3-propylene diamine; 1,4-diaminobutane; 2,2-dimethylpropane diamine-(1,3); 1,6-diaminohexane; 2,5-dimethylhexane diamine-(2,5); 2,2,4-trimethylhexane diamine-(1,6); 1,8-diaminooctane; 1,10-diaminodecane; 1,11-undecane diamine; 1,12-dodecane diamine; 1-methyl-4-(aminoisopropyl)-cyclohexylamine-1; 3-aminomethyl-3,5,5-trimethyl-cyclohexylamine-(1); 1,2-bis-(aminomethyl)-cyclobutane; p-xylylene diamine; 1,2- and 1,4-diaminocyclohexane; 1,2-; 1,4-; 1,5- and 1,8-diaminodecalin; 1-methyl-4-aminoisopropyl-cyclohexylamine-1; 4,4'-diamino-dicyclohexyl; 4,4'-diamino-dicyclohexyl methane; 2,2'-(bis-4-amino-cyclohexyl)-propane; 3,3'-dimethyl-4,4'-diamino-dicyclohexyl methane; 1,2-bis-(4-aminocyclohexyl)-ethane; 3,3',5,5'-tetramethyl-bis-(4-aminocyclohexyl)-methane and -propane; 1,4-bis-(2- aminoethyl)-benzene; benzidine; 4,4'-thiodianiline, dianisidine; 2,4-toluenediamine, diaminoditolylsulfone; 2,6-diaminopyridine; 4-methoxy-6-methyl-m-phenylenediamine; diaminodiphenyl ether; 4,4'-bis(o-toluidine); o-phenylenediamine; o-phenylenediamine, methylenebis(o-chloroaniline); bis(3,4-diaminiophenyl)sulfone; diaminiodiphenylsulfone; 4-chloro-o-phenylenediamine; m-aminobenzylamine; m-phenylenediamine; 4,4'-$C_1$-$C_6$-dianiline such as 4,4'-methylenedianiline; aniline-formaldehyde resin; and trimethylene glycol di-p-aminobenzoate and mixtures thereof.

In further embodiments, the amine crosslinker is selected from the group consisting of bis-(2-aminoethyl)-amine, bis-(3-aminopropyl)-amine, bis-(4-aminobutyl)-amine and bis-(6-aminohexyl)-amine, and isomeric mixtures of dipropylene triamine and dibutylene triamine. In yet further embodiments, the amine crosslinker is selected from the group consisting of hexamethylene diamine, tetramethylene diamine, and dodecane diamine and mixtures thereof.

In other embodiments, the additional crosslinker is a polyol crosslinker. In further embodiments, the polyol crosslinker is selected from the group consisting of polyether-polyols, polyester-polyols, branched derivatives of polyether-polyols (derived from, e.g., glycerine, sorbitol, xylitol, mannitol, glucosides, 1,3,5-trihydroxybenzene), branched derivatives of polyether-polyols (derived from, e.g., glycerine, sorbitol, xylitol, mannitol, glucosides, 1,3,5-trihydroxybenzene), orthophthalate-based polyols, ethylene glycol-based polyols, diethylene glycol-based aromatic and aliphatic polyester-polyols. In further embodiments, the polyol crosslinker is selected from the group consisting of 1,2-propanediol, 1,3-propanediol, diethanolamine, triethanolamine. N,N,N',N'-[tetrakis(2-hydroxyethyl)ethylene diamine], N,N,-diethanolaniline. In other embodiments, the polyol crosslinker is selected from the group consisting of polycaprolactone diol, poly(propylene glycol), poly(ethylene glycol), poly(tetramethylene glycol), polybutadiene diol and their derivatives or copolymers.

Blowing Agents

The crosslinked flame retardant gel may include a blowing agent. In some embodiments, the blowing agent is present at 0 wt % to 25 wt % of the first set of components. In some embodiments, the blowing agent is present at about 20 wt % of the first set of components. In other embodiments, the blowing agent is present at between 10 wt % to 20 wt % of the first set of components. Upon heating, the blowing agent may generate gases that will cause a gel to foam or expand. In one embodiment, the blowing agent is selected from melamine, melamine cyanurate, melamine borate, melamine phosphate, and melamine derivatives. In another embodiment, the blowing agent is melamine. A suitable melamine cyanurate may be supplied by Budenheim Iberica Commercial S.A. (Zaragoza, Spain) under the trade name BUDIT 315, or by Ciba Geigy (Basle, Switzerland) under the trade name MELAPUR.

Stabilizers

In some embodiments, the gels contain at least one stabilizer. Stabilizers include antioxidants, light and UV absorbers/stabilizers, heat stabilizers, metal deactivators, free radical scavengers, carbon black, and antifungal agents.

In one embodiment, the stabilizer is an ester of a hindered phenol. "Ester of a hindered phenol," as used to define one of the components, is intended to cover compounds based on a hindered phenol nucleus (a phenolic structure flanked by two ortho sterically hindering groups, such as t-butyl) which contains an ester substituent, such as —$CH_2CH_2C(O)OR$, where R can be long chain alkyl, such as $C_{16}$-$C_{18}$. In one embodiment, the stabilizer is octadecyl 3,5-di-tert-butyl-4-hydroxyhydrocinnamate, which is commercially available as IRGANOX 1076 from Ciba Geigy. In other embodiments, more than one stabilizer is used. For example, in one embodiment, the gel contains a mixture of IRGANOX 1076, IRGANOX B225 (Ciba), TINUVIN 327 (Ciba), and METASOL TK-100 (Lanxess). In some embodiments, the stabilizer or stabilizers are present at 1.0 wt % to 3.0 wt % of the second set of components. In other embodiments, the stabilizers are 1.0 wt % to 3.0 wt % of the first set of components.

Additional Styrenic Block Copolymers

Many styrenic block copolymers are known in the art and many block copolymers are commercially available. Illustrative commercially available hydrogenated styrenic block copolymers include the polystyrene-poly(ethylene-propylene) diblock copolymers available from Kraton Polymers as KRATON G1701 and G1702; the polystyrene-poly(ethylene-butylene)-polystyrene triblock copolymers available from Kraton Polymers as KRATON G1641, G1650, G1651, G1654, G1657, G1726, G4609, G4610, GRP-6598, RP-6924, MD-6932M, MD-6933, and MD-6939; the polystyrene-poly(ethylene-butylene-styrene)-polystyrene (S-EB/S-S) triblock copolymers available from Kraton Polymers as KRATON RP-6935 and RP-6936, the polystyrene-poly(ethylene-propylene)-polystyrene triblock copolymers available from KRATON Polymers as KRATON G1730; the polystyrene-poly(ethylene-butylene)-polystyrene triblock copolymer comprising 67 wt % polystyrene available from Asahi Kasei Elastomer as TUFTEC H1043; the polystyrene-poly(ethylene-butylene)-polystyrene triblock copolymer comprising 42 weight percent polystyrene available from Asahi Kasei Elastomer as TUFTEC H1051; the polystyrene-poly(butadiene-butylene)-polystyrene triblock copolymers available from Asahi Kasei Elastomer as TUFTEC P1000 and P2000; the polystyrene-polybutadiene-poly(styrene-butadiene)-polybutadiene block copolymer available from Asahi Kasei Elastomer as S.O.E.-SS L601; the polystyrene-poly(ethylene-butylene)-polystyrene triblock copolymer comprising about 60 wt % polystyrene available from Kuraray as SEPTON S8104; the polystyrene-poly(ethylene-ethylene/propylene)-polystyrene triblock copolymers available from Kuraray as SEPTON S4044, S4055, S4077, and S4099; and the polystyrene-poly(ethylene-propylene)-polystyrene triblock copolymer comprising about 65 wt % polystyrene available from Kuraray as SEPTON S2104. Mixtures of two or more block copolymers may be used. Illustrative commercially available unhydrogenated block copolymers include the KRATON D series polymers, including KRATON D1101 and D1102, from Kraton Polymers, and the styrene-butadiene radial teleblock copolymers available as, for example, K-RESIN KR01, KR03, KR05, and KR10 sold by Chevron Phillips Chemical Company. In another embodiment, the styrenic block copolymer is a mixture of high melt viscosity SEBS block copolymer and a functionalized SEBS block copolymer.

Other Optional Components

The compositions are not limited to the types of components listed here. Other common flame retardant components may also be included in the composition. For example, the compositions may include coloring agents, fillers, dispersants, flow improvers, plasticizers, and/or slip agents.

End Uses

The crosslinked flame retardant thermoplastic elastomer gels described herein may be used in a number of end uses due to the improved properties. For examples, in some embodiments, the crosslinked flame retardant thermoplastic elastomer gels are used in fiber optic closure boxes. In other embodiments, the crosslinked flame retardant thermoplastic elastomer gels are used as electrical sealants. In further embodiments, the crosslinked flame retardant thermoplastic elastomer gels are used as electrical closures. In other embodiments, the crosslinked flame retardant thermoplastic elastomer gels are used as gel wraps, clamshells, or gel caps.

In some embodiments, the crosslinked flame retardant thermoplastic elastomer gels are used in environments in excess of 70° C. In other embodiments the crosslinked flame retardant thermoplastic elastomer gels are used in environments in excess of 100° C. In further embodiments, the crosslinked flame retardant thermoplastic elastomer gels are used in environments in excess of 140° C. In other embodiments, the crosslinked flame retardant thermoplastic elastomer gels are used in environments in excess of 160° C. In other embodiments, the crosslinked flame retardant thermoplastic elastomer gels are used in environments in excess of 200° C.

EXAMPLES

Example 1

The following flame retardant gel, in which the percentages are given as weight percent of the total gel composition, was made.

|  | Weight % |
|---|---|
| KRATON MD6684 CS | 2 |
| KRATON G1701 | 5 |
| Stabilizer Composition | 1 |
| DURASYN 148 | 52 |
| Flame Retardant Mixture | 40 |

A flame retardant gel was prepared as follows. A flame retardant mixture was made of ammonium polyphosphate (FR CROS C60 from Budenheim), melamine (Sigma-Aldrich) and pentaerythritol (CHARMOR PM40 from Perstorp) in a 3:1:1 ratio. A stabilizer composition was made of IRGANOX 1076 (Ciba), IRGANOX B225 (Ciba), TINUVIN 327 (Ciba), METASOL TK-100 (Lanxess) in a 1:1:1:0.12 ratio. In a double planetary mixer with an oil bath heat circulator, the stabilizer composition was combined with the maleic anhydride modified SEBS (KRATON MD6684 CS) styrene-ethylene/butylene diblock copolymer, KRATON G1701M and DURASYN 148. The components were mixed at 60% to 80% speed under vacuum at 220° C. for thirty minutes or until components were freely flowing. The flame retardant mixture was preheated for about 10 minutes at 150° C. and then added to the previous composition. The combination was then mixed for 20-30 minutes under vacuum at 180-220° C. Mixing was repeated 2-3 times until the material was finely dispersed. The resulting gel was allowed to cool, compression molded and cured overnight at 90° C.

The resulting gel had about a 20 g hardness measured using a texture analyzer. The resulting gel is also thermomechanically stable at high service temperatures (approximately 120° C.). Flame-retardancy was measured using the Underwriters Laboratory standard UL 94. The resulting gel was found to be highly flame retardant (V-0 on the UL-94 vertical burn test).

Example 2

The following flame retardant gel, in which the percentages are given as weight percent of the total gel composition, was made.

|  | Weight % |
|---|---|
| KRATON MD6684 CS | 3 |
| KRATON G1701 | 2 |
| Stabilizer Composition | 0.78 |
| HYDROBRITE 380 PO | 44.22 |
| Flame Retardant Mixture | 50 |

The stabilizer composition was made of IRGANOX 1076 (Ciba), IRGANOX B225 (Ciba), TINUVIN 327 (Ciba), METASOL TK-100 (Lanxess) in a 1:1:1:0.12 ratio. The resulting gel was found to be highly flame retardant (V-0 on the UL-94 vertical burn test).

Example 3

The following flame retardant gels, in which the percentages are given as weight percent of the total gel composition, were made.

TMA showing increased softening temperature from cross linking the flame retardant (XTPEG) relative to the flame retardant TPEG.

TABLE 1

|  | Flame Retardant TPEG (Weight %) | Flame Retardant XTPEG (Weight %) |
|---|---|---|
| KRATON G1651 | 3.9% | — |
| KRATON MD6684 CS | — | 3.9% |
| KRATON G1701 | 2.6% | 2.6% |
| HYDROBRITE 380 PO | 57.5% | 57.5% |
| Stabilizer Package | 1% | 1% |
| Flame Retardant Package | 35% | 35% |

Flame retardant maleic anhydride modified SEBS was compared to the flame retardant standard SEBS gel. Both gels were filled with 35 weight percent intumescent flame retardant and then their hardness and flammability were measured. Not only did the maleic anhydride modified SEBS material help disperse the filler and lead to a softer gel, but the additional crosslinking led to a material that did not drip flaming particles and passed the UL-94 with the highest rating of V-0. The standard SEBS dripped flaming particles and completely burned, thus leading to a failure rating on the UL-94 vertical burn test.

Thermomechanical Analysis (TMA) was performed on a Rheometric Scientific brand ARES. The TMA test was run using a 7.9 mm plate, pressed against a square gel sample with 10 grams of normal force. A temperature ramp from 40° C. to 200° C. at 5° C./min was performed and the probe was set to respond with 5 gram sensitivity. Hardness, stress-relaxation and tack were performed on a Texture Technologies Corp. brand texture analyzer.

Although examples have been described herein, it should be appreciated that any subsequent arrangement designed to achieve the same or similar purpose may be substituted for the specific examples shown. This disclosure is intended to cover any and all subsequent adaptations or variations of various examples. Combinations of the above examples, and other examples not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single example for the purpose of streamlining the disclosure. This disclosure is not to be interpreted as reflecting an intention that the claimed examples require more features than are expressly recited in each claim. Rather, as the following claims reflect, inventive subject matter may be directed to less than all of the features of any of the disclosed examples. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other examples, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A crosslinked flame retardant thermoplastic elastomer gel comprising:
    a first set of components; the first set of components comprising
        a char catalyst at 50 wt % to 80 wt % of the first set of components,
        a char former at 10 wt % to 25 wt % of the first set of components, the char former being selected from the group consisting of a polyol, a polysaccharide, an aminoplast, tris(hydroxyethyl)isocyanurate (THEIC), and mixtures thereof; and
    a second set of components, the second set of components comprising
        as the sole SEBS material a maleic anhydride-modified SEBS at 2.0 wt % to 4.0 wt % of the second set of components; and
        a softener oil at 70 wt % to 98 wt % of the second set of components;
    the first set of components being between 30 wt % and 50 wt % and the second set of component being between 50 wt % and 70 wt % of the gel, and the maleic anhydride-modified SEBS of the second set of components being the sole SEBS material in the gel, said gel being a soft gel suitable for use as a sealant.

2. The crosslinked flame retardant gel of claim 1 wherein the second set of components further comprises a blowing agent at 0 wt % to 25 wt % of the first set of components, the blowing agent being selected from the group consisting of melamine, melamine cyanurate, melamine borate, melamine phosphate, and melamine derivatives, and combinations thereof.

3. The crosslinked flame retardant gel of claim 1 wherein the char catalyst is 60 wt % to 75 wt % of the first set of components.

4. The crosslinked flame retardant gel of claim 1 wherein the char catalyst is an ammonium polyphosphate.

5. The crosslinked flame retardant gel of claim 4 wherein the ammonium polyphosphate is a coated ammonium polyphosphate.

6. The crosslinked flame retardant gel of claim 1 wherein the char former is present at about 20 wt % of the first set of components.

7. The crosslinked flame retardant gel of claim 1 wherein the char former is pentaerythritol.

8. The crosslinked flame retardant gel of claim 1 wherein the second set of components further comprises at least one stabilizer at 1.0 wt % to 3.0 wt % of the second set of components.

9. The crosslinked flame retardant gel of claim 1 wherein the maleic anhydride-modified SEBS has a maleation level of between 1.0 wt % and 3.0 wt %.

10. The crosslinked flame retardant gel of claim 1 wherein the second set of components further comprises a styrenic block copolymer at 5.0 wt % to 10 wt % of the second set of components.

11. The crosslinked flame retardant gel of claim 1 wherein the softener oil is a white mineral oil.

12. The crosslinked flame retardant gel of claim 1 wherein the softener oil is a polyalpha olefin.

13. The crosslinked flame retardant gel of claim 1 wherein the gel has flame retardancy sufficient to pass the UL-94 test.

14. A method for making a crosslinked flame retardant thermoplastic elastomer gel comprising:
    providing a first set of components, the first set of components comprising:
        a char catalyst, and
        a char former,
    providing a second set of components, the second set of components comprising:
        as the sole SEBS material a maleic anhydride-modified SEBS, the maleic anhydride-modified SEBS is 2.0 wt % to 4.0 wt % of the second set of components; and
        a softener oil; and
    combining the first set of components with the second set of components under conditions sufficient to form a crosslinked polymer gel, wherein the maleic anhydride-modified SEBS of the second set of components being the sole SEBS material in the gel, said gel being a soft gel suitable for use as a sealant.

15. The method of claim 14, wherein the char catalyst is 50 wt % to 80 wt % of the first set of components.

16. The method of claim 14, wherein the char former is 10 wt % to 25 wt % of the first set of components.

17. The method of claim 14, wherein the blowing agent is 10 wt % to 25 wt % of the first set of components.

18. The method of claim 14, wherein the softener oil is 70 wt % to 98 wt % of the second set of components.

19. A crosslinked flame retardant thermoplastic elastomer gel comprising:
    (1) a first set of components, the first set of components comprising
        (a) a char catalyst at 50 wt % to 75 wt % of the first set of components, wherein the char catalyst is a coated ammonium polyphosphate,
        (b) a char former at 15 wt % to 25 wt % of the first set of components, wherein the char former is pentaerythritol, and
        (c) a blowing agent at 10 wt % to 25 wt % of the first set of components, wherein the blowing agent is melamine; and
    (2) a second set of components, the second set of components comprising
        (a) as the sole SEBS material a maleic anhydride-modified SEBS at 2.0 wt % to 4.0 wt % of the second set of components; and
        (b) a softener oil at 70 wt % to 98 wt % of the second set of components, wherein the softener oil is a polyalpha olefin;
        (c) at least one stabilizer at 1.0 wt % to 3.0 wt % of the second set of components, and
    the first set of components being between 30 wt % and 50 wt % of the gel,
    the second set of component being between 50 wt % and 70 wt % of the gel, and
    the gel having flame retardancy sufficient to pass the UL-94 test.

* * * * *